United States Patent Office 3,493,046
Patented Feb. 3, 1970

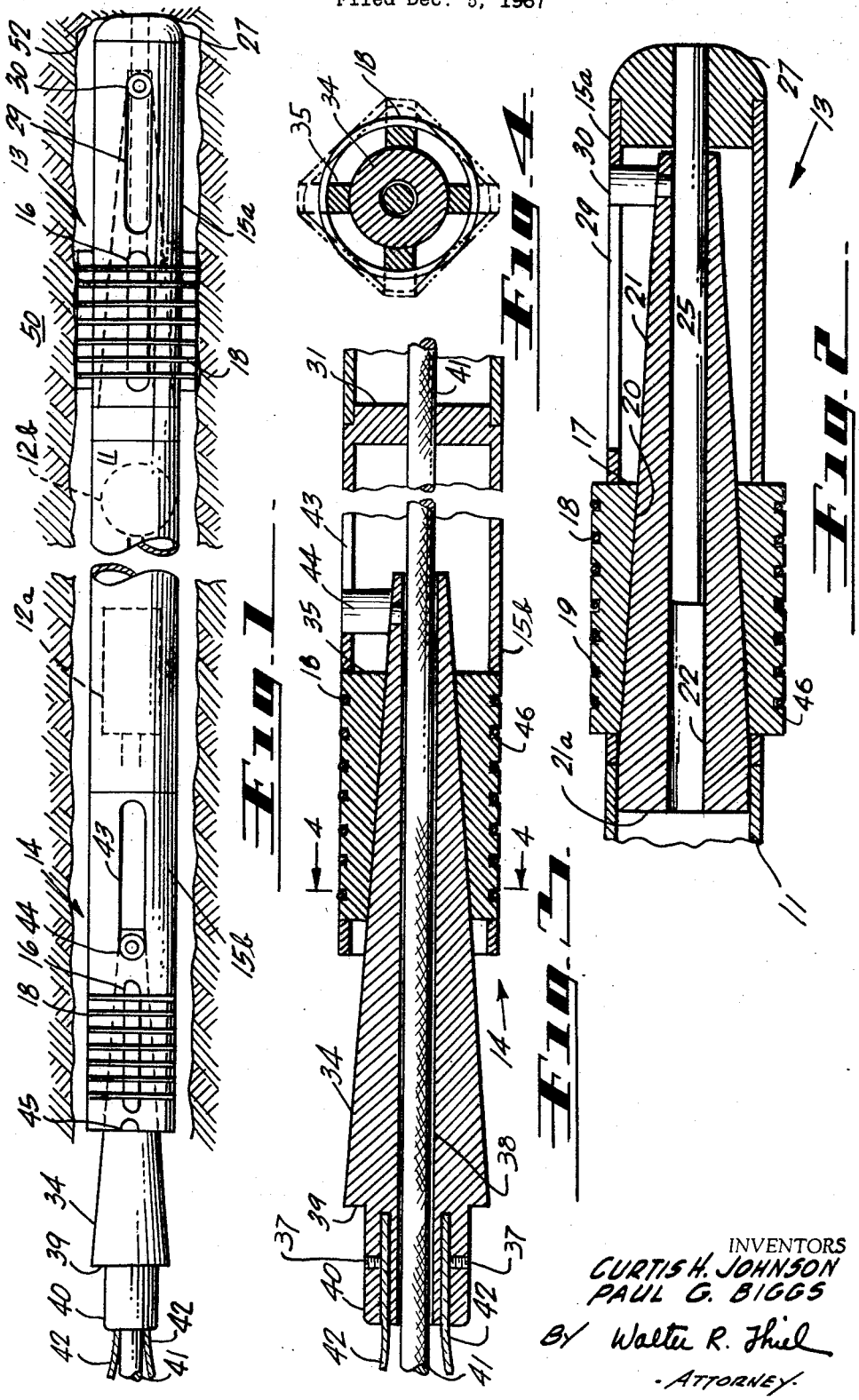

3,493,046
SECURING DEVICE
Curtis H. Johnson, San Marino, and Paul G. Biggs, Northridge, Calif., assignors to Western Geophysical Company, Los Angeles, Calif., a corporation of Delaware
Filed Dec. 5, 1967, Ser. No. 688,246
Int. Cl. E21b 23/00
U.S. Cl. 166—217        4 Claims

ABSTRACT OF THE DISCLOSURE

This is a securing device for holding a portion of an elongated object in contact with at least two opposing surfaces adjacent to the object. At each end of the elongated object is a plurality of slideable wedges, each cooperating with a movable cone for lateral movement into engagement with the adjacent surfaces.

FIELD OF THE INVENTION

This invention relates to a securing device and more particularly to a device for holding a portion of an object in engagement with at least two adjacent opposing surfaces.

BACKGROUND OF THE INVENTION

Geophysical exploration is accomplished using many methods and techniques, one of which is called the seismic method and is based upon the firing of an explosive charge of sufficient magnitude to develop seismic vibrations in a geological material and the sensing of these vibrations by detectors or geophones placed in contact with the material. The geophone converts the seismic vibrations into electrical signals whose shape and intensity are indicative of the shape and intensity of the vibrations from which information about the geological material can be obtained.

PRIOR ART

Heretofore, in most applications of the seismic method geophones have been set on a relatively flat spot occurring naturally at a selected location, or such relatively flat spot prepared by scraping, digging or vertically-downward hole boring. Coupling of the geophone has sometimes been no more than that provided by the force of gravity acting upon the geohpone case; sometimes improved by covering the geophone with soil or sand, and/or by placing the geophone on a base of soil or sand.

However, in the application of seismic methods to mining problems, both exploration and engineering, it is often necessary or advisable to place the geophone in a suitable contact with the geological formation on a vertical face, or even on the overhead face, of a tunnel or the like. In such case the force of gravity precludes simple gravitational contact and/or precludes the use of sand or soil as a cover or base, and it is customary to insert the geophone in a hole bored in the rock face for that purpose or, if available, in a desired position, a naturally-occurring crack or hole in the rock, or a hole previously bored for some other purpose, such as coring or blasting. To prevent rattling of the geophone case in an essentially horizontal borehole, crack, or the like, where hole size and accessibility render sand or soil packing impracticable, or to simply secure the geophone in a hole with a substantial vertically-upward component of direction, two methods have been employed heretofore. If the rock material exhibited reasonably rapid plastic flow, the geophone has been inserted in a tightly-fitting hole and held in place several days with external bracing until the hole gripped the geophone tightly by plastic flow. If the rock did not possess this characteristic, the geophone was cemented into the hole with an expanding cement.

Both of these methods were time-consuming and usually resulted in a loss of the geophone through inability to remove it except by another time-consuming and expensive excavation or drilling operation. The present securing device was developed to overcome these undesirable features of past practice.

It is an object of this invention to provide a securing device which will hold an object in intimate contact with at least two opposing surfaces.

It is a further object of this invention to provide a securing device which may be readily operated to demountably couple a sensor such as a geophone to the wall of a borehole.

SUMMARY OF THE INVENTION

The objects of this invention are accomplished by a novel securing device utilizing at least two tapered cones cooperating with a plurality of wedges slideably mounted for lateral movement in an enclosure containing an item of instrumentation such as a geophone. To operate the device, each of the tapered cones is brought into contact with at least two of the wedges causing them to move laterally into contact with an adjacent surface or wall of a borehole.

It is believed that the invention will be better understood from the following detailed description and drawings throughout which reference characters indicate like parts, and in which:

FIG. 1 is a view showing one embodiment of the invention with one securing device in an extended position and showing the detector or sensing element in dashed lines;

FIG. 2 is a sectional view of one end of the embodiment shown in FIG. 1 showing the securing device activated;

FIG. 3 is a sectional view of the other end of the embodiment shown in FIG. 1 showing the securing device deactivated; and FIG. 4 is a sectional view taken along the 4—4 in FIG. 3 and showing in dashed lines the elastic bands in an extended position.

DESCRIPTION OF PREFERRED EMBODIMENT

Referring to FIGS. 1 and 2, the invention consists of a case or enclosure 11 containing one or more sensing elements 12a, 12b, such as geophones. The enclosure 11 has two ends generally designated as 13 and 14, and respectively including a case 15a and 15b and a plurality of slots 16 parallel with the longitudinal axis of the enclosure 11.

At the end 13 a block or wedge 17, and at end 14 a block or wedge 35, is slideably mounted within each of the slots 16 and a plurality of elastic bands 18 are stretched around the circumference of the case and affixed to each of the blocks 17 and 35. This structure is clearly seen in FIGS. 2, 3 and 4. The slots 16 have a spaced relationship around the circumference of the cases 15a and 15b, and as shown in FIG. 4, may be located at points 90° of arc along the periphery of the case. This specific orientation of the slots 16 has been shown for example only and should not be construed as limiting the invention since they may be provided in other configurations within the scope of the invention.

Referring to FIG. 2, an outer face 19 of the block 17 is shown relatively flat in this embodiment while an inner face 20 of the block is tapered at an angle substantially conforming to the angle of taper of a cone 21. The cone 21 has a small taper and includes a central longitudinal bore 22. The largest end 21a of the cone 21 serves as a lug for enclosure 11 and is held in position by a pin not shown). An axially-positioned rod 25 cooperating ith bore 22 to guide cone 21 is secured to cap 27 by a in (not shown), cap 27 being secured to case 15a by ins (not shown). A slot 29 is journaled in case 15a and rves to provide a stop for a pin 30 which is threadedly fixed to cone 21.

Referring now to FIG. 3, the other end 14 of the enclosure 11 is closed by end plate 31 of the case 15b which held in place by a pin (not shown). A tapered cone 4, similar to cone 21, is slideably mounted in the case 15b nd cooperates with a plurality of wedges 35 in a similar ashion to the operation of the end 13. Elastic bands 18 re affixed to blocks 35 in a similar fashion as to blocks 7. If desired, a hollow rod (not shown) may be attached ) the end plate 31 and extended into the case 15b along ie longitudinal center line for guiding the tapered cone 4. The wedges 35 are slideably mounted in one of the lots 16 journaled through the case 15b. The larger end 9 of cone 34 terminates in a hollow boss 40. An electrical conductor 41 passes freely through a central longitudinal bore 38 in the cone 34 and is coupled (not shown) o the sensing elements 12a, 12b. A number of cables 42 re held in bores in the boss 40 by set screws 37.

A slot 43 is journaled through the case 15b and cooperates with a pin 44 threadedly affixed to tapered cone 4 to serve as a stop to limit the longitudinal travel of the one 34. A notch 45 (FIG. 1) has been provided in the nd of case 15b to indicate the orientation of the transerse sensing units such as 12b.

While the wedges 17 and 35 have been shown and lescribed as having a relatively flat outer surface 19, vhich in the deactivated position is substantially flush vith the surface of the cases 15a and 15b and the enclosure 11, it should be understood, without varying from he scope of this invention, that the outer surface 19 can ave a variety of shapes, such as inclined or tapered, and eed not be flush with the surface. A tapered surface vould enable the wedges to engage the walls of tapered oreholes. In addition, wedges of greater height can be sed when the geophone is to be coupled to the wall of oreholes which are substantially larger than the diameter of the case 11.

In practice, a variety of wedges of various heights and/ or outer-surface configuration, but all fitting into slots 16 and with inner faces tapered to conform with the taper of cones 21 and 34, may be conveniently provided on the ob to provide a selection to fit any configuration of the orehole.

Referring now to FIGS. 2 and 3, for a restoring force each of the plurality of elastic bands 18 is affixed to the wedges 17 and 35 by an annular slot 46 in the wedges and, as shown in dashed lines in FIG. 4, are stretched when the wedges are laterally extended by the cones 21, 34 respectively. In this fashion a restoring force is applied to the blocks when they are extended. While elastic bands have been shown as creating the restoring force, it should be understood that other devices and methods can be used to create this force without varying from the scope of this invention.

OPERATION

With the cones 21, 34 in the inoperative position and the wedges 17 and 35 retracted, the device is placed in a borehole 50, FIG. 1. A special tool (not shown) is placed over the hollow boss 40 and contacts the relatively flat end 39 of the case 15b. A tongue on the tool interlocks with notch 45 to properly align the sensing unit. The device is pushed into the borehole until cap 27 strikes the end 52 of the borehole. Further pressure causes the cone 21 to move toward the end 52 and the wedges 17 to ride up the advancing cone. In this position the wedges 17 contact the adjacent surface 50, or borehole wall, as shown in FIG. 1. The special tool is removed and another tool is inserted which applies pressure to the end of the hollow boss 40 while a slight tension is maintained on electrical conductor 41. The pressure causes the cone 34 to force wedge 35 out against the adjacent surface or borehole wall. Thus the wedges are held in intimate contact with the walls of the borehole and are capable of coupling seismic vibrations to the sensor 12.

When it is desired to remove the device from the borehole, a removing force is applied by pulling on cables 42 which causes the cones 21, 34 to move to the left, as shown in FIG. 1. Wedges 17 and 35 are restored to their retracted position by the elastic bands 18 and the device may then be removed from the hole.

It is to be understood that if the end 52 of the borehole is farther than desired from the opening as, for example, when a naturally-occurring hole or a hole previously bored for another purpose is used, a plug of suitable length can be inserted into the hole to provide a solid base against which pressure can be applied. It should also be understood that in the event the end 52 of the borehole is so close to the opening that wedges 35 lie outside the borehole, but enclosure 11 is substantially within the borehole, auxiliary tapered wedges may be firmly, but not violently, driven between enclosure 11 and the walls of the borehole to perform the function of securing end 14 of enclosure 11 to the rock formation. In such case such auxiliary wedges should protrude far enough from the borehole so that they may be withdrawn before cables 42 are pulled to unclamp end 13 of enclosure 11.

Though a preferred embodiment, as described, provides clamping and unclamping of both the innermost end and the outermost end of enclosure 11, many of the advantages of the invention would be realized by providing such means for the innermost end only, driven wedges being employed for the outermost end. In practice the use of driven outer wedges would be feasible if all holes were plugged to a length such that end 14 of enclosure 11 protruded slightly from the borehole of enclosure 11 or if enclosure 11 were provided with a rigid extension of sufficient length to protrude slightly from the borehole.

While a particular embodiment of the invention has been described in detail, many modifications and variations therein may be resorted to without departing from the teachings of the invention, and the scope of the invention is limited only by a just interpretation of the following claims.

What is claimed is:
1. In an apparatus for mounting at least one geophone in a borehole in geological material;
   an elongated casing having first and second relatively movable sections, said first section defining an inner end which is inserted into the borehole first, and said second section of said casing defining an accessible outer end;
   at least one geophone mounted in said casing intermediate said sections;
   a first set of holding elements in said first section;
   tapered means in juxtaposition with said first set of said holding elements to force said elements outward as said inner end engages the bottom of a borehole;
   a second set of holding elements located toward the outer end of said casing;
   a tapered means in said second section for expanding said second set of holding elements; and
   means at the outer end of said casing for releasing both said first and second sets of holding elements.
2. A device as defined in claim 1 wherein:
   said first and second holding elements each include at least two wedges equally spaced around the circumference of said case, said tapered means includes a cone having taper of sufficient degree to laterally move said wedges as each of the cones moves longitudinally; and said device includes restoring means cooperating with said wedges to restore each to a deactivated position when said cones are moved from engagement with said wedges.

3. In an apparatus for mounting at least one transducer in a bore hole in geological material, said apparatus comprising:
   an elongated casing having first and second relatively movable sections, said first section defining an inner end which is inserted into the bore hole first, and said second section of said casing defining an accessible outer end;
   at least one transducer mounted in said casing intermediate said sections;
   at least a first set of holding elements in said first section;
   tapered means in juxtaposition with said first set of said holding elements to force said elements outward as said inner end engages the bottom of a bore hole; and
   means at the outer end of said casing for releasing said first set of holding elements.

4. The apparatus of claim 3 and further including:
   at least a second set of holding elements located toward the outer end of said casing; and
   a tapered means in said second section for expanding said second set of holding elements.

References Cited

UNITED STATES PATENTS

| | | | |
|---|---|---|---|
| 2,832,419 | 4/1958 | Webber | 166—216 X |
| 1,874,688 | 8/1932 | Zuck et al. | 166—216 X |
| 2,132,061 | 10/1938 | Walker | 166—217 |
| 2,578,900 | 12/1951 | Ragan | 166—119 |
| 2,805,723 | 9/1957 | Young | 166—216 X |
| 2,920,703 | 1/1960 | Rodgers | 166—217 X |
| 3,195,646 | 7/1965 | Brown | 166—216 X |
| 3,356,142 | 12/1967 | Crow et al. | 166—134 |

DAVID H. BROWN, Primary Examiner